US009577713B2

(12) United States Patent
Christ

(10) Patent No.: US 9,577,713 B2
(45) Date of Patent: Feb. 21, 2017

(54) METHOD AND SYSTEM FOR ALIGNING CONDUCTORS FOR CAPACITIVE WIRELESS POWER TRANSMISSION

(75) Inventor: John Randall Christ, Santa Clara, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 352 days.

(21) Appl. No.: 13/248,077

(22) Filed: Sep. 29, 2011

(65) Prior Publication Data

US 2013/0082540 A1    Apr. 4, 2013

(51) Int. Cl.
*H04B 5/00*   (2006.01)

(52) U.S. Cl.
CPC .......... *H04B 5/0037* (2013.01); *H04B 5/0012* (2013.01)

(58) Field of Classification Search
CPC ....................................................... H02J 7/025
USPC .......................................... 307/104; 320/108
See application file for complete search history.

(56) References Cited

U.S. PATENT DOCUMENTS

| | | | | |
|---|---|---|---|---|
| 7,893,697 B2* | 2/2011 | Ramsey | ................. | G01B 7/023 324/662 |
| 7,932,723 B2 | 4/2011 | Forgang et al. | | |
| 8,587,154 B2* | 11/2013 | Fells | ........ | H01F 38/14 307/104 |
| 2010/0033021 A1* | 2/2010 | Bennett | .................. | H02J 17/00 307/104 |
| 2010/0073177 A1* | 3/2010 | Azancot | .................. | H02J 5/005 340/657 |
| 2010/0081378 A1* | 4/2010 | Kawamura | ............. | H02J 7/025 455/41.1 |
| 2010/0087143 A1 | 4/2010 | Bonin | | |
| 2010/0109443 A1 | 5/2010 | Cook et al. | | |
| 2010/0181841 A1* | 7/2010 | Azancot | .................. | H01F 38/14 307/104 |
| 2010/0201203 A1* | 8/2010 | Schatz | ..................... | H01Q 7/00 307/104 |
| 2010/0285672 A1 | 11/2010 | Symons et al. | | |
| 2011/0050382 A1* | 3/2011 | Baarman | .................. | H01F 1/26 336/221 |
| 2012/0052923 A1* | 3/2012 | Park | ....................... | H02J 7/025 455/567 |

OTHER PUBLICATIONS

2-D Alignment Analysis of Capacitively Couple contactless Power Transfer System. 2010 Choa Liu.*
Liu, 2-D Alignment Analysis of Capacitively Coupled contactless Power Transfer System—2010.*
Kline et al., "Capacitive Power Transfer fo Contactless Charging", IEEE, 2011, pp. 1398-1404.

* cited by examiner

*Primary Examiner* — Rexford Barnie
*Assistant Examiner* — Daniel Kessie
(74) *Attorney, Agent, or Firm* — Buchanan Ingersoll & Rooney PC

(57) ABSTRACT

A method of aligning a capacitive wireless power transmission system, the method comprises: providing a transmitter device having a capacitive conductor; positioning a receiver device having a capacitive conductor in proximity to the capacitive conductor of the transmitter device; and aligning the capacitive conductors of the transmitter device and the receiver device with one another using a display panel on the receiver device to optimize a transfer of power between the capacitive conductors.

17 Claims, 4 Drawing Sheets

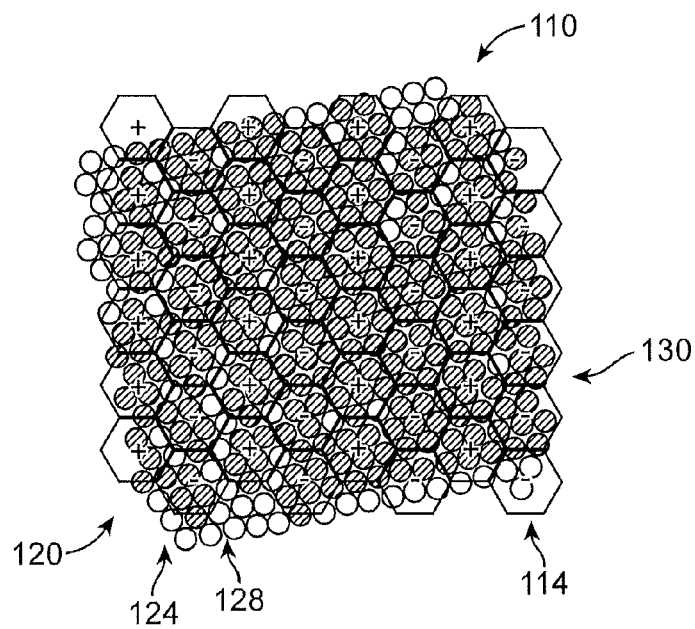
FIG. 3
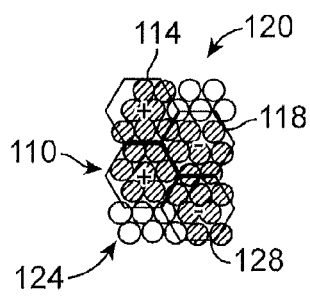 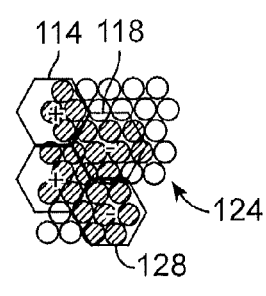 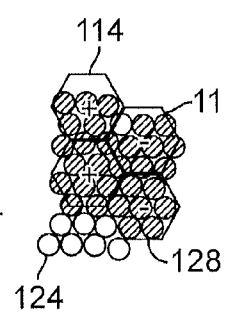 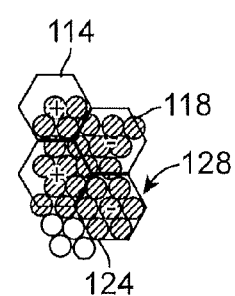
FIG. 4　　FIG. 5　　FIG. 6　　FIG. 7
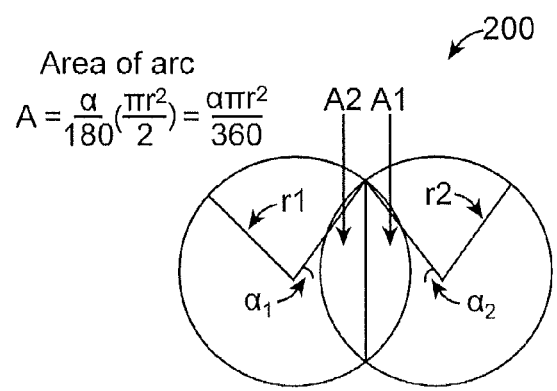
FIG. 8

METHOD AND SYSTEM FOR ALIGNING CONDUCTORS FOR CAPACITIVE WIRELESS POWER TRANSMISSION

FIELD OF THE INVENTION

The present invention relates to a method and system for aligning capacitive conductors for capacitive wireless power transmission, and more particularly to a system and method of aligning capacitive conductors and/or conductive plates to maximize the transfer of energy and/or a source of power from a transmitter panel to a receiver panel using an LED display panel to optimize the transfer of power between the capacitive conductors and/or conductive plates.

BACKGROUND OF THE INVENTION

Wireless power transmission systems are being used to power and charge devices including personal data systems, phones, cameras, laptop computers, light sources, flat panel displays and the like. Most systems use an inductive, interface between a charging station, acting as a transmitter and a receiver, which receives the charge. The transmitter and the receiver are fitted with electrical coils, which when brought into physical proximity, power flows from the transmitter to the receiver.

Alternatively, a capacitive interface can be used between two capacitive conductors or conductive plates, which alleviates the need for magnetic flux guiding and shielding components that add bulk and cost to inductive solutions. However, one limitation of a capacitive interface is that the realizable amount of coupling capacitance is limited by the available area of the capacitive conductors. Accordingly, it would be desirable to have a system and method of aligning the conductors or panels to maximize the transfer of energy and/or source of power from the transmitter to the receiver.

SUMMARY OF THE INVENTION

In consideration of the above issues, a system and method of a system and method of aligning the conductors of a capacitive interface to maximize the transfer of energy and/or source of power from a capacitive conductor or conductive plate of a transmitter to a capacitive conductor or conductive plate of a receiver is disclosed herein.

In accordance with an exemplary embodiment, a method of aligning a capacitive wireless power transmission system, the method comprises: providing a transmitter device having a capacitive conductor; positioning a receiver device having a capacitive conductor in proximity to the capacitive conductor of the transmitter device; and aligning the capacitive conductors of the transmitter device and the receiver device with one another using a display panel on the receiver device to optimize a transfer of power between the capacitive conductors.

In accordance with another exemplary embodiment, a capacitive wireless power transmission system, comprises: a transmitting device having a capacitive conductor; a receiver device having a capacitive conductor in proximity to the capacitive conductor of the transmitter device; and a display panel for aligning the capacitive conductors of the transmitter device and the receiver device with one another to optimize a transfer of power between the capacitive conductors.

In accordance with a further exemplary embodiment, a computer program product comprising a non-transitory computer usable medium having a computer readable code embodied therein for aligning a capacitive wireless power transmission system, the process comprises: providing a transmitter device having a capacitive conductor; positioning a receiver device having a capacitive conductor in proximity to the capacitive conductor of the transmitter device; and aligning the capacitive conductors of the transmitter device and the receiver device with one another using a display panel on the receiver device to optimize a transfer of power between the capacitive conductors.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 3 is an illustration of a conductor of a receiver device rotated or shifted counter clockwise with respect to a conductor of a transmitter device in accordance with another exemplary embodiment.

FIG. 4 is an illustration of an alignment configuration, wherein the capacitive conductor of the receiver and the transmitter device are aligned both vertically and horizontally.

FIG. 5 is an illustration of an alignment configuration, wherein the capacitive conductor of the receiver device is shifted to the right of the capacitive conductor of the transmitter device.

FIG. 6 is an illustration of an alignment configuration, wherein the capacitive conductor of the receiver device is shifted downward relative to the capacitive conductor of the transmitter device.

FIG. 7 is an illustration of an alignment configuration, wherein the capacitive conductor of the receiver device is shifted diagonally down and to the right of the capacitive conductor of the transmitter device.

FIG. 8 is an illustration showing a method of calculating an area of two intersecting circles for use in aligning capacitive conductors in accordance with an exemplary embodiment.

DESCRIPTION OF THE PREFERRED EMBODIMENTS

Figure 1:
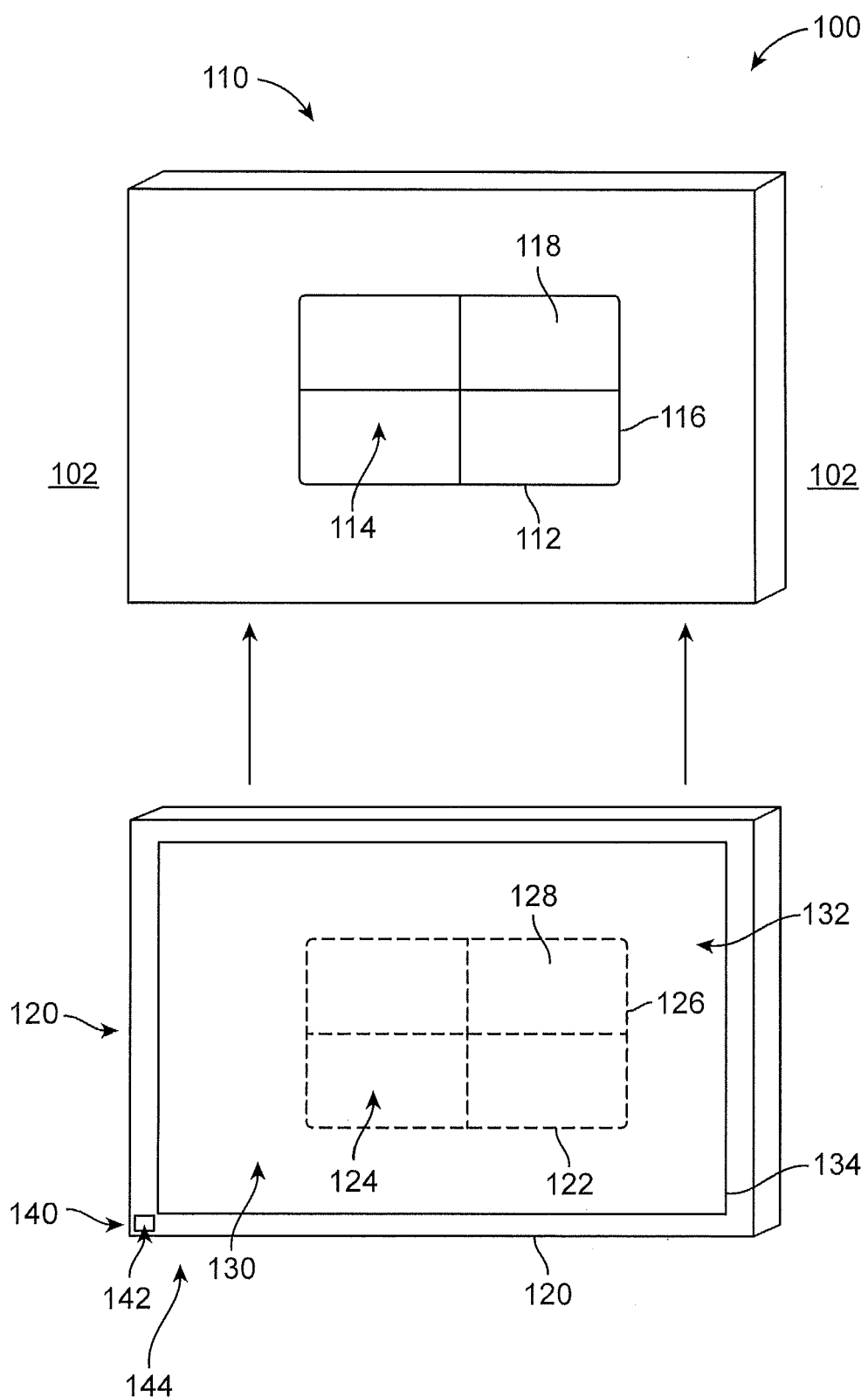
FIG. 1 is an illustration of a capacitive wireless power transmission system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a capacitive wireless power transmission system 100 in accordance with an exemplary embodiment. As shown in FIG. 1, the system 100 includes a transmitter device (or system) 110 having a capacitive conductor 114 and a receiver device (or system) 120 having capacitive conductor 124. The receiver device 120 receives a source of power (or energy) from the transmitter device 110 when the capacitive conductors 114, 124 are brought into physical proximity to one another.

In accordance with an exemplary embodiment, the transmitter device 110 is preferably a transmitter conductor panel 112 having a capacitive conductor 114. The capacitive conductor 114 is preferably in the form of a conductive plate 116. In accordance with an exemplary embodiment, the capacitive conductor 114 is a plurality of conductors 118. The transmitter device 110 has an electronic circuit (not shown) having a power source (e.g., alternating current (AC current), direct current (DC current) and/or batteries), which produces an electrical field, which delivers a source of power to the receiver device 120. The circuit is preferably relatively thin and comprised of electronically conductive pathways printed, painted or otherwise deposited on a thin, flexible substrate such as, for example, a film or polymeric web, e.g., circuit is a printed flexible circuit. In addition, to the power source, the circuit preferably also includes one or more electronic components which control the level, waveform shape, polarity, timing, etc. of the electric current applied by panel. For example, the circuit may contain one or more of the following electronic components: control circuitry such as a current controller (e.g., a resistor or a transistor-based current control circuit), an on/off switch, and/or a microprocessor adapted to control the current output of the power source over time.

The receiver system 120 is also preferably in the form of a receiver conductor panel 122 having a capacitive conductor 124. The capacitive conductor 124 is preferably in the form of a conductive plate 126, which when placed in proximity to the capacitive conductor 114 of transmitter conductor panel 112 receives a source of power or energy from the transmitter panel 112. In accordance with an exemplary embodiment, the capacitive conductor 124 is a plurality of conductors 128. The receiver conductor panel 122 is preferably a rectangular panel having an audio and/or a visual display associated therewith.

In accordance with an exemplary embodiment, the receiver device 120 preferably includes a circuit (not shown), which is preferably a relatively thin and comprised of electronically conductive pathways printed, painted or otherwise deposited on a thin, flexible substrate such as, for example, a film or polymeric web, e.g., circuit is a printed flexible circuit. The circuit preferably also contains one or more of the following electronic components: control circuitry such as a current controller (e.g., a resistor or a transistor-based current control circuit), an on/off switch, and/or a central processing unit (CPU) or a microprocessor to calculate and display the relative positions of the capacitive conductors 114, 124, and/or calculate electrical output of the capacitive conductor 124 of the receiver device 120.

In accordance with an exemplary embodiment, the transmitter device 110 is preferably a system or subsystem, which is attachable or mountable to a wall or wall-like structure 102. The placement of the receiver device 120 in physical proximity to the transmitter device 110 provides for the transfer of energy and/or a source of power from the transmitter device 110 to the receiver device 120. In accordance with an exemplary embodiment, each of the capacitive conductors 114, 124 can have essentially any size or shape, whether square, oval, circular, or tailored for a specific use and/or design of the transmitter device 110 and/or receiver device 120. However, the capacitive conductors 114, 124 are preferably conductive plates 116, 126 have identical or nearly identical shapes to maximize the delivery and/or transfer of power from the transmitter device 110 to the receiver device 120. In accordance with an exemplary embodiment, the receiver device 120 has a display panel 130, 140, which provides an audio signal and/or a visual feedback or display to a user regarding alignment of the conductors of the transmitter device 110 and the receiver device 120.

In accordance with an exemplary embodiment, the receiver device 120 is an LED display or flat panel display 130, which uses light-emitting diodes 132 as a visual feedback in the form of a video display 134. The LED display or flat panel display 130 can be a small display, or a component of a larger display, which can be used indoors and/or outdoors in store signs and billboards, destination signs on public transport vehicles or even as part of transparent glass area. Alternatively, the LED display or flat panel display 130 can be used as form of lighting, for the purpose of general illumination, task lighting, or even stage lighting rather than a display.

In accordance with an exemplary embodiment, the transmitter panel 112 and the receiver panel 122 are aligned with one another using an LED (light emitting diode) display panel 140, which is located on the receiver device 120. The LED display panel 140 is comprised of a plurality of light emitting diodes 142, which forms a display panel 144. The display panel 144 is preferably positioned on an outer surface and/or edge of the receiver device 120. Alternatively, if the receiver device 120 is a display panel as set forth above having an LED display or flat panel display 130, the LED display or flat panel display 130 can be used to align the respective capacitive conductors 114, 124 on the transmitter device 110 and the receiver device 120 to optimize the transfer of power between the capacitive conductors 114, 124.

As shown in FIG. 1, in accordance with an exemplary embodiment, the LED display panel 140 is preferably located on an outer edge or surface of the receiver device 120. The LED display panel 140 is preferably powered via an electron transfer from the transmitter capacitive conductor 114 to the receiver capacitive conductor 124. In accordance with an exemplary embodiment, the LED display panel 140 is connected to a central processing unit (CPU) and/or microprocessor, which receives information from the transmitter device 110 and the receiver device 120 pertaining to the area and shape of each of the capacitive conductors 114, 124 associated with the respective devices 110, 120. The corresponding area and shape of each of the conductors 114, 124 are visually displayed on the LED display panel 140, which provides the user and/or operator the ability to adjust the positioning of the receiver conductor panel 122, and more particularly, the capacitive conductor 124 associated with the receiver conductor panel 122 with regards to the capacitive conductor 114 of the transmitter device 110 to maximize energy transfer between the two conductors 114, 124. In accordance with an exemplary embodiment, each of the conductors 114, 124 are displayed as a plurality of conductors 118, 128 with a respective shape thereto. For example, as shown in FIG. 3, the conductor 114 for the transmitter device 110 can be shown as a plurality of conductors 118 having a hexagon shape, and the conductor 124 for the receiver device 120 can be shown as a plurality of conductors having a circular shape thereto. Alternatively, the system 100 can be designed to provide an audio response or signal to the user with instructions on the location of the conductors 114, 124 relative to one another and/or reference to a relative strength and/or location of the conductors 114, 124.

The light emitting diodes (LEDs) 132, 142 on the display panel 130, 140 are preferably an organic light emitting diode (OLED). An OLED is a light-emitting diode (LED) in which the emissive electroluminescent layer is a film of organic compounds, which emit light in response to an electric current. The layer of organic semiconductor material is situated between two electrodes, the anode and cathode, which are deposited on a substrate. When an electric current is applied to the anode and the cathode (i.e., conductors), an electroluminescent light is produced from the organic material.

In accordance with an exemplary embodiment, a method of aligning a capacitive wireless power transmission system is disclosed herein. The method includes the steps of: providing a transmitter device 110 having a capacitive conductor 114. A receiver device 120 having a capacitive conductor 124 is positioned in proximity to the transmitter device 110 and the capacitive conductors 114, 124 of the transmitter device 110 and the receiver device 120 are aligned with one another using a display panel 130, 140 on the receiver device 120 to optimize a transfer of power between the capacitive conductors 114, 124.

In order to optimize the transfer of power between the capacitive conductors 114, 124, one can calculate the capacitance of the conductive plates 116, 126 as follows: Parallel plate capacitance is $C=(\epsilon A)/d$, wherein $\epsilon$ is permittivity, A is area in meters squared (m$^2$), d is distance between parallel plates or panels (in meters), and C is capacitance of the parallel plate capacitor. Permittivity in free space is approximately $8.854^{-12}$ Farads/meter (or 8.854 pF/m). Thus, if the conductors 114, 124 of the transmitter conductor panel 112 and the receiver conductor panel 122 are not aligned, the offset and/or misalignment can affect the capacitance proportional to the overlapping area of the capacitive conductor and/or conductive plates 114, 124. Accordingly, it would be desirable to align the conductors 114, 124 to maximize energy and power transfer between the two conductors 114, 124.

Figure 2:
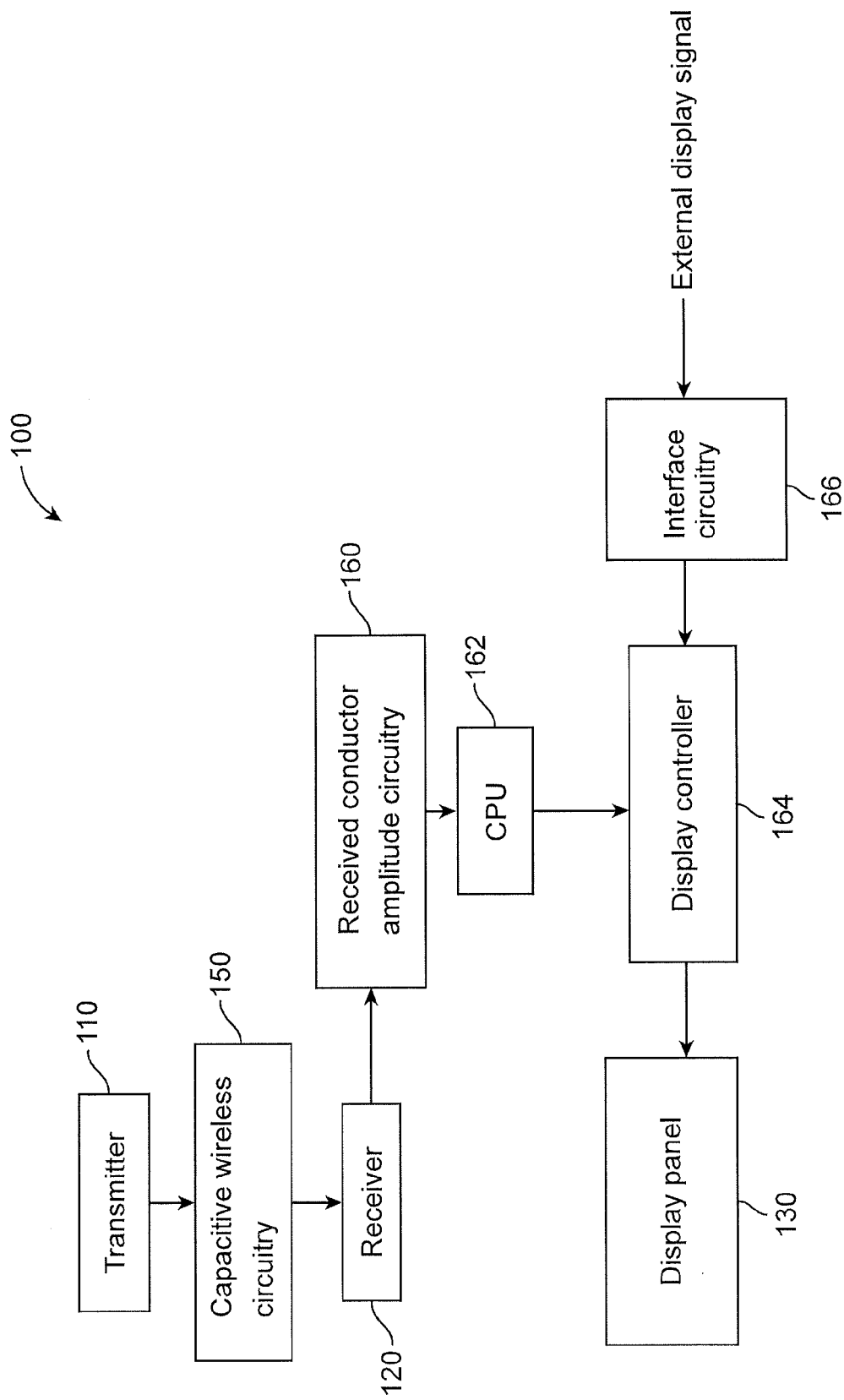
FIG. 2 is a block diagram of a capacitive wireless power transmission system in accordance with an exemplary embodiment.

FIG. 2 is a block diagram of a capacitive wireless power transmission system 100 in accordance with the exemplary embodiment as shown in FIG. 1. As shown in FIG. 2, the system 100 includes a transmitter device 110 and a receiver device 120. The transmitter device 110 includes capacitive wireless circuitry 150, which provides capacitive wireless communication between the transmitter device 110 and the receiver device 120. The receiver device 120 includes a received conductor amplitude circuitry 160 and a central processing unit (CPU) and/or microprocessor 162. The CPU and/or microprocessor 160 communicate with a display panel 130. In accordance with an exemplary embodiment, the display panel 130 preferably includes a display controller 164 and interface circuitry 166. The interface circuitry 166 can be configured to receive an external display signal, which is transmitted to the display controller 164, and then sent to the display panel 130. The display panel 130 receives the external display signal and displays an image and/or audio sound based on the received external display signal.

FIG. 3 is an illustration of a capacitive conductor 124 rotated and/or shifted counter clockwise with respect to the capacitive conductor 114 of the transmitter device 110. In accordance with an exemplary embodiment, the LED display panel 130 (or 140) displays the capacitive conductor 124 (e.g., circles) of the receiver device 120 relative to the capacitive conductor 114 of the transmitter device (e.g., hexagons). As shown in FIG. 3, the capacitive conductor 124 of the receiver device 120 on the lower right corner, lower left corner, upper left corner, and upper right corner all have no or limited power. In addition, some of the capacitive conductors 128 of the receiver device along the edges have power, while some of the other conductors 128 have no power and/or limited power along the edges.

FIG. 4 is an illustration of an alignment configuration, wherein the capacitive conductors 124 of the receiver device 120 and the capacitive conductors 114 of the transmitter device 110 are aligned both vertically and horizontally. As shown in FIG. 4, the plurality of conductors 128 (which are represented by a plurality of circles) of the receiver device 120 are aligned both vertically and horizontally with the plurality of conductors 118 (which are represented by a plurality of hexagons) of the transmitter device 110.

FIGS. 5-7 are illustrations of various alignment configurations of conductors 118, 128 of the transmitter device 110 and the receiver device 120. For example, FIG. 5 is an illustration of an alignment configuration, wherein the plurality of conductors 128 of the receiver device 120 is shifted to the right of the plurality of conductors 118 of the transmitter device 110. FIG. 6 is an illustration of an alignment configuration, wherein the plurality of conductors 128 of the receiver device 120 is shifted downward relative to the plurality of conductors 118 of the transmitter device 110. FIG. 7 is an illustration of an alignment configuration, wherein the plurality of conductors 128 of the receiver device 120 is shifted diagonally down and to the right of the plurality of conductors 118 of the transmitter device 110.

In accordance with an exemplary embodiment, the transfer of power between the capacitive conductors can be calculated by obtaining an area and a shape of the capacitive conductors 114, 124 for the transmitter and receiver devices 110, 120, and displaying on the display panel 130, 140, the area and the shape of the capacitive conductor 114 for the transmitter device 110 relative to the area and the shape of the capacitive conductor 124 of the receiver device 120 on the display panel 130, 140. In accordance with an exemplary embodiment, the capacitive conductor 124 of the receiver device 120 can be adjusted by a user based on the comparison of the capacitive conductors 114, 124 relative to one another.

In accordance with another exemplary embodiment, the position of the conductor 124, and/or the plurality of conductors 128 for the receiver device 120 can be calculated based on the electrical output of the conductors 124 and/or the plurality of conductors 128 of the receiver device 120. As shown in FIGS. 3-7, the positioning of the capacitive conductor 124 for the receiver device 120 relative to the capacitive conductor 114 of the transmitter device 110 can be determined by checking the output of the conductor 124 of the receiver device 120 at a corner and/or an edge of the receiver device 120. For example, in accordance with an exemplary embodiment, the alignment can be determined based on a known output (e.g., maximum output) of the capacitive conductor 124 and a current and/or measured output of the capacitance conductor 124 of the receiver device 120. In accordance with an exemplary embodiment, the current and/or measured output is measure and sent to a computer processing unit (CPU) and/or microprocessor within the receiver device 120 for processing. Once the current and/or measured output is calculated and compared to a known output, a relative number or calculation can be either provide via an audio signal and/or visually displaced on the display panel 130, 140.

In an exemplary embodiment, the capacitive conductors 114, 124 can be a plurality of conductors 118, 128 having a circular shape thereto, and the alignment can be determined by calculating the area of two intersecting circles. Once the area of the circular shape of the conductors 118, 128 is obtained, a CPU and/or microprocessor within the receiver device 110 can generate an estimated alignment based on a known and/or maximum current, and a measured and/or current output of the capacitive conductors 124 of the receiver device 120. The area of two intersecting circles 200 can be calculated as shown in FIG. 8, using the following calculations: wherein $r_1$ is the radius of circle 1, $r_2$ is the radius of circle 2, $\alpha_1$ is the angle to the intersecting area of circle 1, $\alpha_2$ is the angle to the intersecting area of circle 2. The area of the arc is equal to $$A = \frac{\alpha}{180}\left(\frac{\pi r^2}{2}\right) = \frac{\alpha \pi r^2}{360}.$$

The area of a triangle can be calculated by A=½ bh and A=½ (r cos α)(r sin α). The area defined as A1 is calculated as $A1=A_{arc}-A_{triangle}$, $$A1 = \frac{\alpha_1}{180}\left(\frac{\pi r_1^2}{2}\right) - 1/2(r_1 \cos \alpha_1)(r_1 \sin \alpha_1).$$

The area of intersection being calculated as A=2(A1+A2) and $$A1 = \frac{\alpha_1}{180}\left(\frac{\pi r_1^2}{2}\right) - 1/2(r_1 \cos \alpha_1)(r_1 \sin \alpha_1).$$

In accordance with an exemplary embodiment, using the calculation of the area of the two intersecting circles, an audio signal and/or visual display can be given to the user and/or operator to adjust the positioning of the capacitive conductors 124, 128 based on the offset as determined by the intersection of the two circles representing the conductors 114, 124 of the respective transmitter and receiver devices 110, 120.

Figure 9:
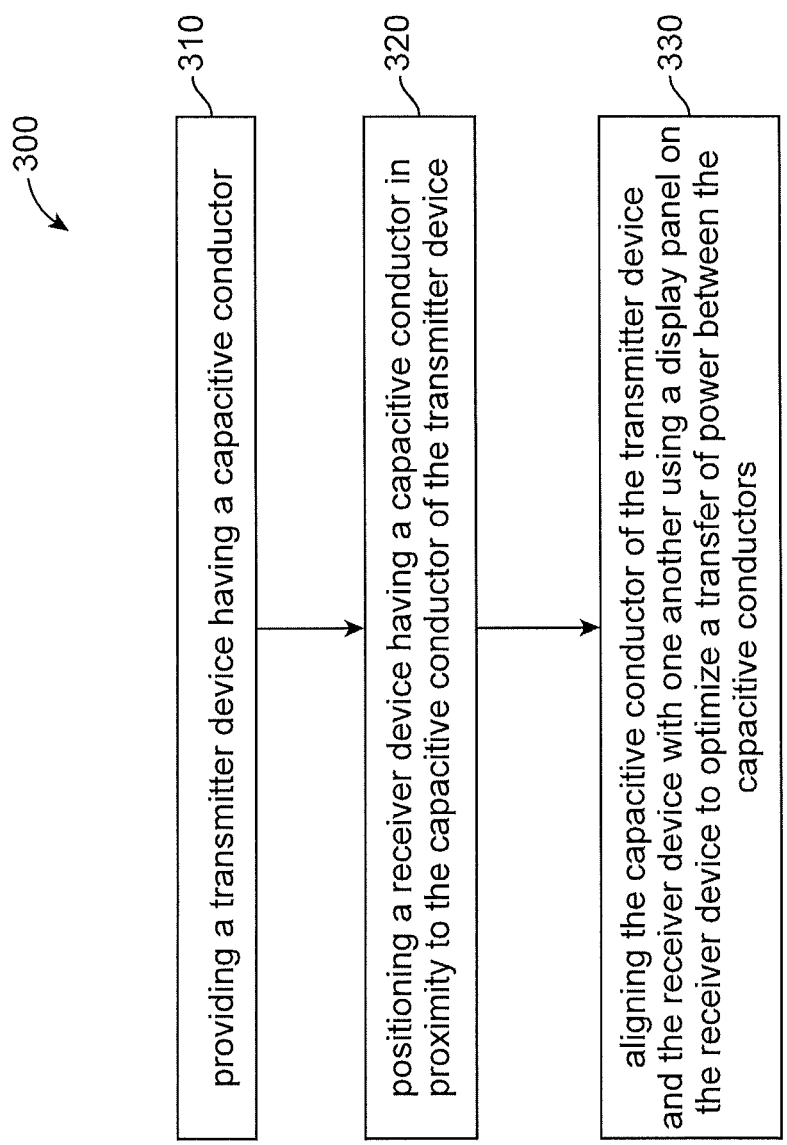
FIG. 9 is a flow chart illustrating a method of aligning a capacitive conductor of a transmitter device and a capacitive conductor of a receiver device with one another using an LED display panel on the receiver device to optimize a transfer of power between the capacitive conductors.

FIG. 9 is a flow chart illustrating a method 300 of aligning a capacitive conductor of a transmitter device and a capacitive conductor of a receiver device with one another using an LED display panel on the receiver device to optimize a transfer of power between the capacitive conductors. In step 310, a transmitter device having a capacitive conductor is provided. In step 320, a receiver device having a capacitive conductor is positioned in proximity to the capacitive conductor of the transmitter device. In step 330, the capacitive conductors of the transmitter device and the receiver device are aligned with one another using a display panel on the receiver device to optimize a transfer of power between the capacitive conductors.

A computer program product comprising a non-transitory computer usable medium having a computer readable code embodied therein for aligning a capacitive wireless power transmission system, the process comprises: providing a transmitter device having a capacitive conductor; positioning a receiver device having a capacitive conductor in proximity to the capacitive conductor of the transmitter device; and aligning the capacitive conductors of the transmitter device and the receiver device with one another using a display panel on the receiver device to optimize a transfer of power between the capacitive conductors.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of aligning a capacitive wireless power transmission system on a wall or wall-like structure, the method comprising:
   providing a transmitter device having a plurality of capacitive conductors, the plurality of capacitive conductors forming a conductive plate configured to deliver a source of power;
   positioning a receiver device having a plurality of capacitive conductors forming a conductive plate in proximity to the conductive plate of the transmitter device;
   calculating and displaying on a display panel on the receiver device, a corresponding shape and area of each of the plurality of capacitive conductors of the transmitter device relative to a corresponding shape and area of each of the plurality of capacitive conductors of the receiver device;
   visually illustrating on the display panel each of the plurality of capacitive conductors of the receiver device which are receiving power from each of the plurality of capacitive conductor of the receiver device which are not receiving power;
   aligning the plurality of capacitive conductors of the receiver device with the plurality of capacitive conductor of the transmitter device using the display panel on the receiver device to optimize a transfer of power from the plurality of capacitive conductors of the transmitter device to the plurality of capacitive conductors of the receiver device by aligning the corresponding shape and
   area of the plurality of capacitive conductors of the transmitter device with the corresponding shape and area of the plurality of capacitive conductors of the receiver device and wherein each of the plurality of plurality of capacitive conductors of the transmitter device have a hexagon shape and each of the plurality of capacitive conductors of the receiver device have a circular shape.

2. The method of claim 1, wherein the display panel is an LED display panel comprised of a plurality of organic light emitting diodes (OLEDs).

3. The method of claim 1, wherein the plurality of capacitive conductors of the transmitter and receiver devices are capacitive plates.

4. The method of claim 1, comprising: determining the position of the plurality of capacitive conductors for the receiver device based on an output of electrical characteristics of the plurality of capacitive conductors of the receiver device on the display panel on the receiver device.

5. The method of claim 4, comprising: determining positioning of the plurality of capacitive conductors for the receiver device to the plurality of capacitive conductors of the transmitter device by checking output of the plurality of capacitive conductors of the receiver device on the display panel on the receiver device located at a corner and/or an edge of the receiver device.

6. The method of claim 4, comprising: determining alignment based on a known maximum output and a measured output of the plurality of capacitive conductors of the receiver device.

7. The method of claim 6, wherein the plurality of capacitive conductors of the transmitter device and the receiver device, each have a circular shape thereto and determining alignment by calculating an area of an intersection of the circular shape of the plurality of capacitive conductors for the transmitter device and the receiver device.

8. The method of claim 1, wherein the display panel provides audio feedback to a user regarding alignment of the plurality of capacitive conductors of the transmitter device and the receiver device.

9. A capacitive wireless power transmission system, comprising:
a transmitting device having a plurality of capacitive conductors, the plurality of capacitive conductors forming a conductive plate configured to deliver a source of power;
a receiver device having a plurality of capacitive conductors, the plurality of capacitive conductors forming a conductive plate, and wherein the plurality of capacitive conductors on the receiver device is configured to be placed in proximity to the plurality of capacitive conductors of the transmitter device; and
a display panel on the receiver device, wherein the display panel is configured to align the plurality of capacitive conductors of the transmitter device and the receiver device with one another to optimize a transfer of power from the plurality of capacitive conductors of the transmitter device to the plurality of capacitive conductors of the receiver device, wherein the aligning of the plurality of capacitive conductors of the transmitter device and the receiver device comprises:
obtaining an area and a shape of the capacitive conductors the transmitter and receiver devices;
calculating and displaying on the display panel, the area and the shape of each of the plurality of capacitive conductors for the transmitter device relative to the area and the shape of each of the plurality of capacitive conductors of the receiver device on the display panel
visually illustrating on the display panel each of the plurality of capacitive conductors of the receiver device which are receiving power from each of the plurality of capacitive conductor of the receiver device which are not receiving power;
adjusting the plurality of capacitive conductors of the receiver device relative to the plurality of capacitive conductors of the transmitter and wherein each of the plurality of plurality of capacitive conductors of the transmitter device have a hexagon shape and each of the plurality of capacitive conductors of the receiver device have a circular shape.

10. The system of claim 9, wherein the display panel is an LED display panel comprised of a plurality of organic light emitting diodes (OLEDs).

11. The system of claim 9, wherein the plurality of capacitive conductors of the transmitter and receiver devices are capacitive plates.

12. The system of claim 9, comprising: determining the position of the plurality of capacitive conductors for the receiver device based on electrical characteristics of an output of the plurality of capacitive conductors of the receiver device.

13. The system of claim 9, wherein the transmitter device is affixed to a wall of a structure, and the receiver device is part of an electrical device having the display panel.

14. A computer program product comprising a non-transitory computer usable medium having a computer readable code embodied therein for aligning a capacitive wireless power transmission system, the process comprising:
providing a transmitter device having a plurality of capacitive conductors, the plurality of capacitive conductors forming a conductive plate configured to deliver a source of power;
positioning a receiver device having a plurality of capacitive conductors, the plurality of capacitive conductors forming a conductive plate in proximity to the plurality of capacitive conductors of the transmitter device; and
aligning the plurality of capacitive conductors of the transmitter device and the receiver device with one another using a display panel on the receiver device to optimize a transfer of power from the plurality of capacitive conductors of the transmitter device to the plurality of capacitive conductors of the receiver device, wherein the aligning the plurality of capacitive conductors of the transmitter device and the receiver device comprises:
obtaining an area and a shape of the plurality of capacitive conductors the transmitter and receiver devices
calculating and displaying on the display panel, the area and the shape of each of the plurality of capacitive conductors for the transmitter device relative to the area and the shape of each of the plurality of capacitive conductors of the receiver device on the display panel;
visually illustrating on the display panel each of the plurality of capacitive conductors of the receiver device which are receiving power from each of the plurality of capacitive conductor of the receiver device which are not receiving power;
adjusting the plurality of capacitive conductors of the receiver device relative to the plurality of capacitive conductors of the transmitter and wherein each of the plurality of capacitive conductors of the transmitter device have a hexagon shape and each of the plurality of capacitive conductors of the receiver device have a circular shape.

15. The computer program product of claim 14, wherein the display panel is an LED display panel comprised of a plurality of organic light emitting diodes (OLEDs).

16. The computer program product of claim 14, comprising:
determining the position of the plurality of capacitive conductors for the receiver device based on an output of electrical characteristics of the plurality of capacitive conductors of the receiver device.

17. The computer program product of claim 14, comprising: determining alignment based on a known maximum output and a measured output of the plurality of capacitance conductors of the receiver device.

* * * * *